Sept. 14, 1954  J. F. JOY  2,688,907
MOBILE SOIL TILLING MACHINE
Filed Feb. 28, 1950  3 Sheets-Sheet 2
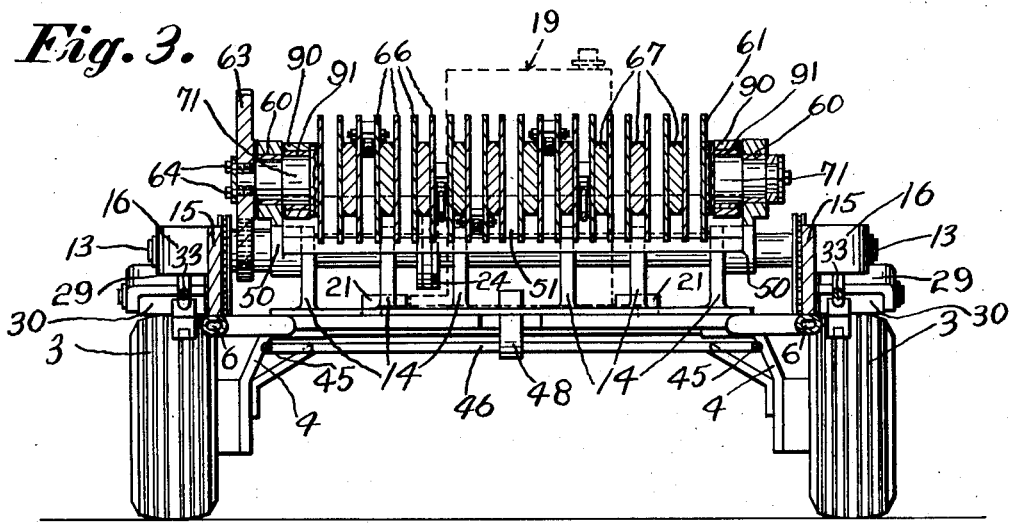
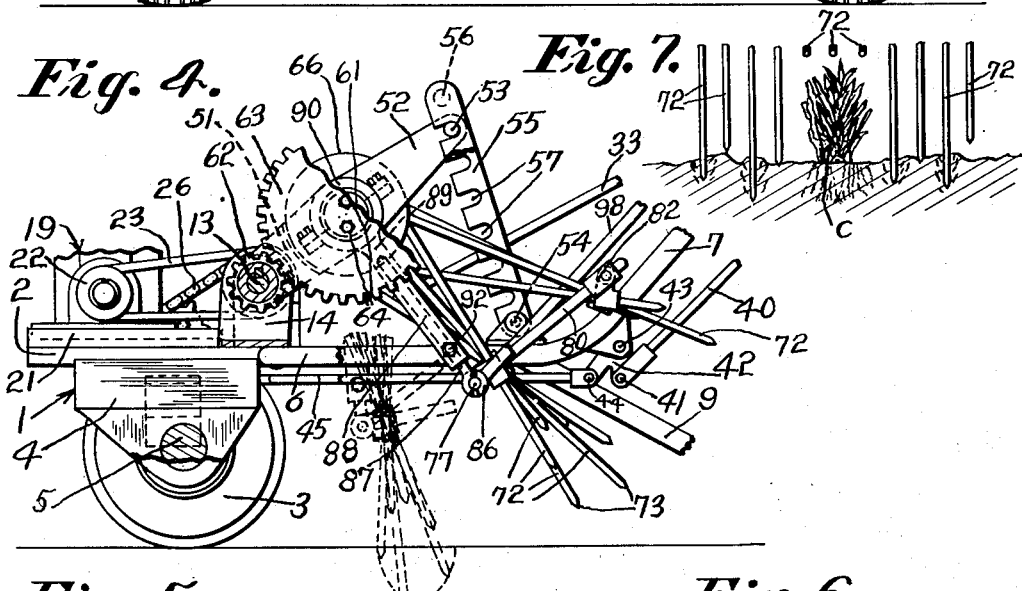
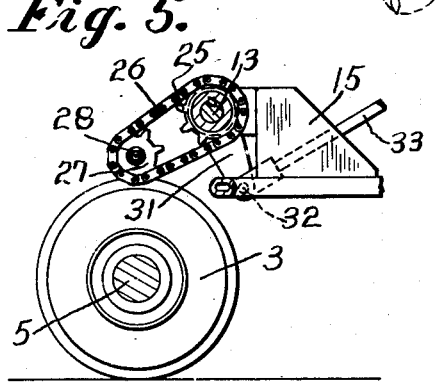
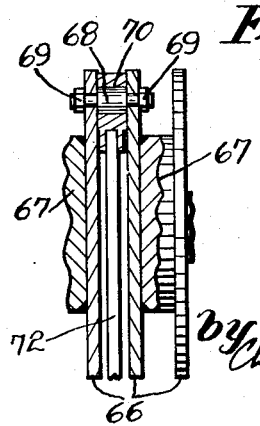
Inventor:
Joseph F. Joy
by Charles F. Osgood,
Attorney Sept. 14, 1954  J. F. JOY  2,688,907
MOBILE SOIL TILLING MACHINE
Filed Feb. 28, 1950  3 Sheets-Sheet 3
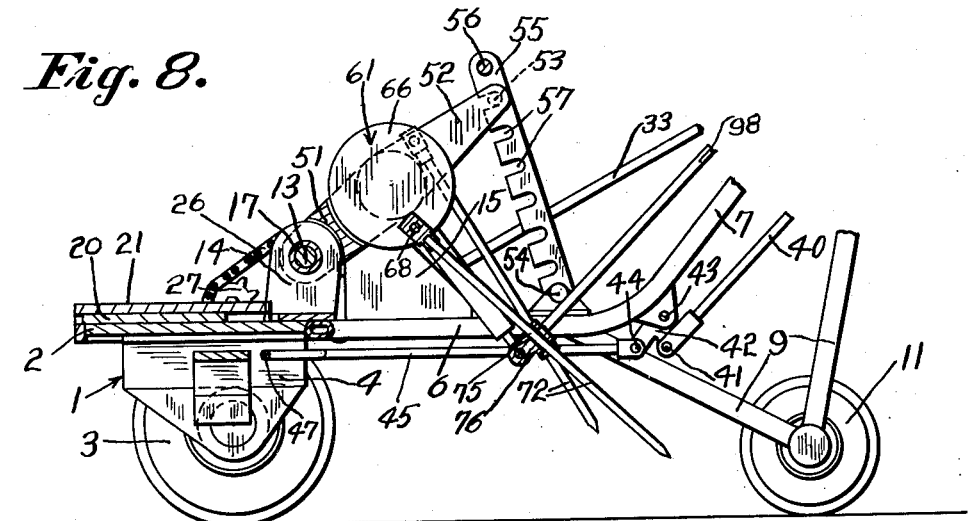
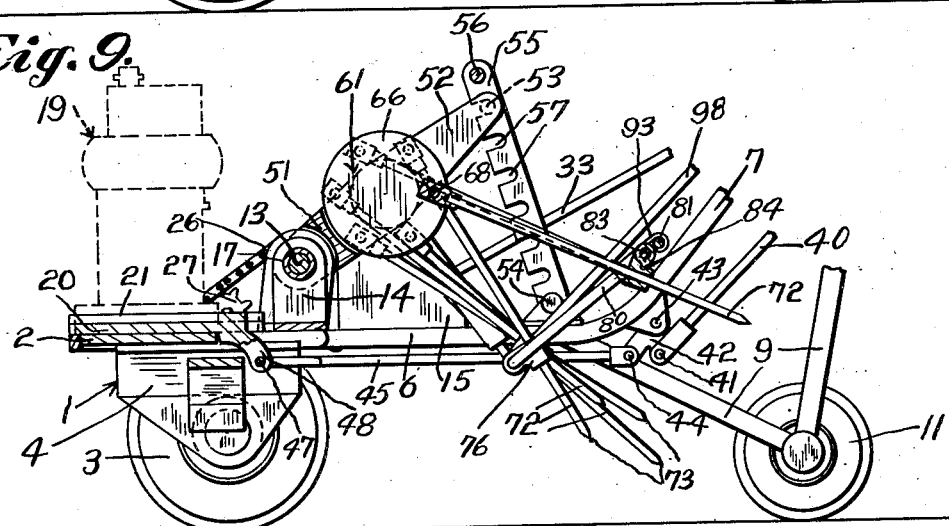
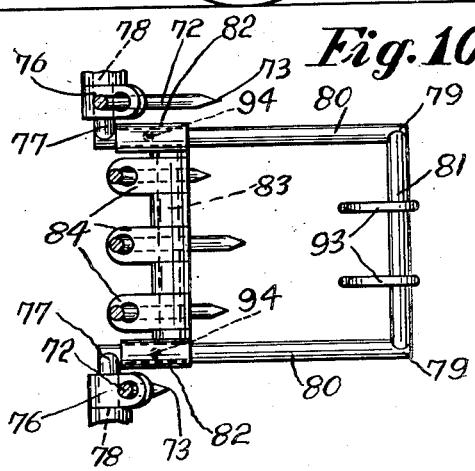
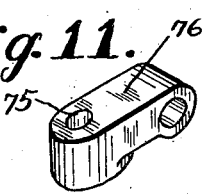
Inventor:
Joseph F. Joy
by Charles F. Osgood.
Attorney Patented Sept. 14, 1954

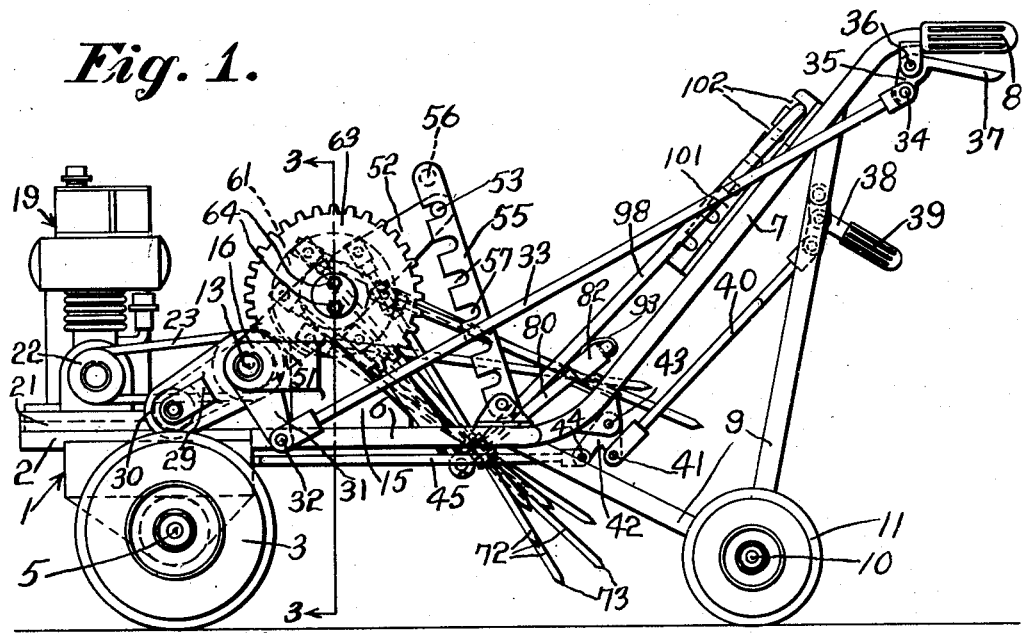

2,688,907

UNITED STATES PATENT OFFICE 2,688,907

MOBILE SOIL TILLING MACHINE

Joseph F. Joy, Pittsburgh, Pa., assignor to Joy Manufacturing Company, Pittsburgh, Pa., a corporation of Pennsylvania Application February 28, 1950, Serial No. 146,881

14 Claims. (Cl. 97—36)

This invention relates to soil tillers and more particularly to a soil tilling machine of the reciprocating tiller bar type having improved adjustable mounting, guiding and driving means for the tiller bars.

In a soil tiller it is desirable to provide a machine which is readily mobile and easily handled; which may have its tilling devices penetrate the soil at different depths; which may vary the paths of movement of the tilling devices to vary the digging action; and which may till the soil along paths not only of substantial width, but which may also straddle a crop row to till the soil in parallel paths at opposite sides of the crop row during cultivation. It is within the contemplation of the present invention to provide an improved soil tilling machine which has all of the desirable characteristics above referred to, and which embodies mechanical features whereby the desired functions may be accomplished in an efficient manner.

An object of the present invention is to provide an improved soil tilling machine. Another object is to provide an improved soil tiller of the reciprocatory tiller bar type whereby the soil may be agitated in an extremely effective manner. Yet another object is to provide an improved soil tiller embodying mechanism whereby the reciprocatory tiller bars may penetrate the soil at different depths with respect to the ground surface to suit different conditions. Still another object is to provide an improved adjustable mounting and guiding means for varying the profiles or contour of the paths of movement of the tiller bars for varying the digging action of the tilling points. A further object is to provide an improved tiller bar arrangement for a soil tiller whereby crop rows may be straddled by the machine so that the soil may be tilled at opposite sides of a crop row without damage to the crops. A still further object is to provide an improved tiller bar arrangement whereby may not only the crop row be straddled to provide spaced narrow paths in which the soil is tilled, but also the tiller bars may be adjusted and operated to till paths of substantially continuous lateral extent, when the straddling of crop rows is not desired. Another object is to provide in a soil tiller of the above character improved mounting and driving means for the tilling elements and embodying improved means whereby certain of the tiller elements may be lifted out of contact with the earth while others of the tiller elements may continue to agitate the soil. Still another object is to provide an improved soil tilling machine having novel features of construction and novel arrangements and combinations of parts. These and other objects and advantages of the invention will, however, hereinafter more fully appear.

In the accompanying drawings there is shown for purposes of illustration one form which the invention may assume in practice.

In these drawings:

Fig. 1 is a side elevational view of a soil tilling machine constructed in accordance with a preferred illustrative embodiment of the invention.

Fig. 2 is a plan view of the soil tilling machine shown in Fig. 1.

Fig. 3 is a cross sectional view taken on line 3—3 of Fig. 1, illustrating details of construction.

Fig. 4 is a longitudinal vertical section taken substantially on line 4—4 of Fig. 2, showing the intermediate tiller bars in raised position.

Fig. 5 is a detail longitudinal vertical section taken on line 5—5 of Fig. 2, illustrating details of the traction wheel drive.

Fig. 6 is an enlarged fragmentary section through the crank shaft showing the crank pin structure.

Fig. 7 is a somewhat schematic view showing the intermediate tiller bars raised to clear a crop row while the side tiller bars are positioned to agitate the soil at the sides of the crop row.

Fig. 8 is a longitudinal vertical section taken substantially on line 8—8 of Fig. 2.

Fig. 9 is a central longitudinal vertical section taken on line 9—9 of Fig. 2.

Fig. 10 is a fragmentary plan view illustrating the U-shaped support whereby the intermediate tiller bars may be elevated with respect to the other tiller bars, showing the guide blocks arranged with the guide block openings in transverse side by side alignment.

Fig. 11 is a perspective view of one of the guide blocks for the tiller bars.

In this illustrative construction, as shown in the drawings, the soil tilling machine comprises a mobile base or carriage 1 having a frame 2 mounted on front rubber-tired traction wheels 3, and the frame has a transverse drop axle structure 4 providing stub axles 5 on which the traction wheels are journaled. Projecting horizontally rearwardly from the base frame 2 are tubular side frame members 6 having rearwardly and upwardly inclined portions 7 which terminate in rearward handle portions which carry conveniently located handle grips 8. An operator may stand at the rear of the machine in a position to grip the handles whereby the machine may be controlled and directed. Projecting downwardly from the side frame members are frame elements 9 which are suitably transversely braced and which carry stub axles 10 on which rear rubber-tired supporting wheels 11 are journaled. Thus, a readily mobile and relatively light, self-propelled, and easily handled and directed base structure is provided which may travel over the ground surface.

A horizontal cross shaft or rod 13 is suitably mounted in bearing sleeves supported by a series of intermediate parallel vertical supports 14 carried by the base frame and by end brackets 15 secured to the base frame and having outwardly located bearing supporting portions 16 in which the outer ends of the cross shaft are mounted. Suitable spacing sleeves 17 may surround the cross shaft between the spaced supports and the end bracket portions. A prime mover, desirably a small internal combustion engine 19, is mounted on a sliding plate 20 guided in longitudinal guideways of horizontal guide members 21 secured to the base frame, and the motor shaft carries a drive pulley 22 which is connectible by an endless belt 23 to a pulley 24 keyed to the cross shaft 13. Also keyed to the cross shaft 13 near its opposite ends are chain sprockets 25 which are connected by endless drive chains 26 to chain sprockets 27 fixed to horizontal shafts 28 which are arranged parallel with the cross shaft 13. These shafts 28 are mounted on swingable frame elements 29 pivotally mounted on the cross shaft and carrying bearings on which rubber-faced driving rollers 30 are journaled, and these driving rollers are movable into engagement with the treads of the rubber tires of the front traction wheels 3 for driving the latter. The swingable frame elements 29 are desirably in the form of bell cranks and have downwardly extending lever arms 31 which are pivotally connected at 32 to the front lower ends of operating rods 33 which extend rearwardly and upwardly along the outer sides of the side frame members 6, as shown in Figs. 1 and 2. The upper ends of these operating rods are pivotally connected at 34 to operating levers 35 pivotally mounted at 36 on the handle portions of the side frame members and having grasping portions 37 underlying the handle grips 8 whereby the operating levers may be readily gripped by the hands of the machine operator. By properly operating the levers 35, the frames 29 may be individually swung about their pivots to move the driving rollers 30 into driving contact with the tire-treads of the front wheels whereby the latter may be driven to propel and steer the machine. A conveniently centrally located hand lever 38 having a hand grip 39 is pivotally mounted on the cross brace structure for supporting elements 9 for the rear wheels, and this operating lever is connected by an operating rod structure 40 pivotally connected at 41 at its front lower ends to bell crank levers 42 pivoted at 43 on brackets secured beneath the side frame members 6 of the base frame, and these bell cranks are pivotally connected at 44 to an operating rod structure 45 which extends forwardly beneath the side frame members and which has a front transverse portion 46 connected at 47 to a depending lug 48 secured to the rear end of the sliding plate 20 on which the driving engine is mounted. The operator may manipulate the lever 38 to effect sliding of the driving engine back and forth along its guideway relative to the base frame, thereby to effect tightening or loosening of the driving belt 23 as desired, to control the drive of the cross shaft 13. The operating lever 38 may be provided with a conventional detent or other holding means to hold the lever in its different positions of adjustment, in a well-known manner.

Pivotally mounted on the cross shaft 13 near its opposite ends at the sides of the base frame, inside of the swingable frames 29, are swingable frame elements 50 which may be transversely united by a cross bar portion 51 to provide a rigid swingable frame structure, and these swingable side frames have rearwardly projecting arm portions 52 which carry pins 53 at their upper ends. Pivotally mounted at 54 on brackets supported by the side frame members 6 are notched lever arms 55 which are transversely connected at their upper ends by a cross connecting rod 56 which may serve as a handle. The arms 55 are notched at 57 along their forward edges to receive the pins 53. Thus, the swingable frames 50 may be adjusted into different angular positions about their pivots as determined by the spacing of the notches 57 in the holding levers. Journaled in bearings 60 supported by the swingable frames 50, as shown in Fig. 3, are the end portions of a crank shaft 61, and a gear 62 keyed to the cross shaft 13 meshes with a gear 63 fixed as by screws 64 to one end portion of the crank shaft, to drive the latter. The crank shaft 61 is desirably of a fabricated, welded construction composed of a series of spaced-apart, coaxial, circular plates 66 welded in pairs in spaced relation to coaxial circular blocks 67, and the spaced plates between which no circular blocks are present are connected together by bolts 68 held in position by nuts 69. These bolts provide crank pins 70. The outer end plates are welded to stub shaft portions 71 which are journaled in the bearings 60 carried by the swingable frames 50, as shown in Fig. 3. There are herein, for illustrative purposes, shown eleven pairs of coacting plates 66 providing eleven crank pins 70 which are herein desirably set at 60° apart along the length of the crank shaft, and pivotally engaging these crank pins and extending outwardly through the spaces between the pairs of plates which are connected by the crank pins are reciprocatory tiller bars or rods 72 provided with appropriately shaped lower terminal ends herein shown as pointed at 73. These tiller bars or rods near their lower pointed terminal ends pass through and are guided in suitable openings 75 in guide blocks 76 which are pivotally mounted on a transverse rod structure 77. The openings 75 in the guide blocks are formed to provide the necessary freedom of sliding movement of the tiller bars and may be suitably bushed so that when wear becomes excessive the bushings may be readily replaced. This transverse rod structure 77 on which the guide blocks are pivotally mounted has aligned horizontal side portions 78, and herein desirably four of the swingable guide blocks are pivotally mounted on each horizontal side rod portion (see Fig. 2). The central portion of the rod structure is generally U-shaped at 79 (see also Fig. 10), and comprises right-angle rod portions 80 at the legs of the U and a cross connecting portion 81 at the base of the U, and the connecting portion 81 extends in parallelism with the horizontal rod portions 78 in the manner shown. Guided for sliding adjustment longitudinally of the angular rod portions 80 are sliding support elements 82 which support a cross rod 83 which is disposed parallel with the horizontal rod portions, and this cross rod herein desirably supports the other three oppositely disposed guide blocks, herein designated 84, for the three intermediate tiller bars. Evidently, the total number of the tiller bars and guide blocks and the number of the intermediate tiller bars and guide blocks may be varied as desired, and the numbers herein shown have been chosen merely for purposes of illustration. The rod structure 77 has the opposite ends of its horizontal side portions 78 pivotally supported in eye-members 86 (Fig. 4) integral with slide rods 87 guided for endwise adjustment in the bores of tubular sleevelike members 88 which are rigidly secured at 89 to support members 90 pivotally mounted on bearings 91 supported by the crank shaft in Fig. 3. Set screws 92 threaded in the walls of the sleevelike guide members 88 are adjustable to secure the slide rods 87 in adjusted position. By adjusting the slide rods the rod structure 77 which supports the swiveled guide blocks 76 and 84 may be moved lengthwise of the tiller bars to locate the guide blocks nearer to the terminal pointed ends of the tiller bars so that as the latter are reciprocated the shape and size of the orbital paths of the digging points may be modified to vary the digging action of the tiller bars. In Fig. 10 the guide openings in the series of guide blocks are in substantially side by side transverse alignment so that the series of eleven tiller bars are guided at approximately the same points along their lengths. The sliding support elements 82 may be slid upwardly along the rod portions 80 to raise the three intermediate guide blocks 84 so that the three intermediate tiller bars are held upwardly with their terminal digging points located a substantial distance above the ground, as shown in Figs. 1, 4 and 9. As shown schematically in Fig. 7, the intermediate tiller bars when raised clear the top of a crop row designated C, so that the machine straddles the crop row with the side tiller bars agitating the soil along parallel paths at the sides of the crop row for cultivation purposes. A spring clip or clips 93 attached to the cross connecting portion 81 of the U-shaped rod structure may hook onto the cross rod 83 as shown in Fig. 9 to hold the guide blocks 84 and the intermediate tiller bars in such raised position. In the event there is any tendency for the sliding support elements 82 to raise up along the rod portions 80 during the digging and tilling operation, set screws 94, indicated in dotted lines in Fig. 10, may be threaded in the support elements to engage the rod portions 80 to lock the sliding supports rigidly in their lowered position as shown in Fig. 10, in an obvious manner. Under most conditions, however, such set screws are not necessary since the intermediate guide blocks 84 tend to remain in their lowermost positions by gravity. The rod structure 77 may be swung on its pivotal mounting on the crank shaft, and the swinging means therefor comprises side rod portions 98 pivotally connected at 99 to the ends of the horizontal side rod portions 78, and these rod portions 98 extend upwardly and rearwardly and are connected by a transverse handle portion 100. Notched plates 101 are rigidly secured to the forward sides of the inclined portion 7 of the side frame members and the transverse handle 100 is receivable in any one of a series of notches 102 formed in the front upper edges of these plates. Thus, the rod structure 77 may be raised and lowered as desired to vary the depth of penetration of the terminal digging points of the tiller bars into the soil and may be held in such adjusted positions by engagement of the handle portion 100 with the proper notches in the notched plates. Also, by means of this operating rod structure 98, the tiller bars may be readily swung about their pivotal mounting on the crank shaft into and out of tilling position.

The general mode of use of the improved soil tilling machine is as follows. The operator may stand in back of the machine and grip the handle grips 8 to guide and control the machine, and the hand lever 38 may be manipulated to slide the engine-mounting forwardly on its guideways on the base frame to effect tightening of the drive belt 23 thereby to effect drive of the wheel driving rollers 30 and the tiller devices. When both hand lever grips 37 are grasped and held by the operator, the wheel driving rollers 30 are pressed tightly against the treads of the rubber tires of the front traction wheels 3 to effect propulsion of the machine, and by loosening the grip on one or the other of the hand levers 37 the relative driving speeds of the front wheels may be varied to effect steering of the machine. If it is desired sharply to turn the machine the drive for one wheel is interrupted while the other wheel is driven. During travel of the machine to and from its working place, the crank shaft frame structure 50 is swung up, as shown in Fig. 4, with the tiller bars located a substantial distance above the ground surface, and when the machine arrives at the working place the notched lever arms 55 may be swung back and the crank shaft frame structure may be swung downwardly about its pivotal mounting to bring the tiller bars into tilling position, as indicated in dotted lines in Fig. 4. The depth of penetration of the terminal pointed ends 73 of the tiller bars may be varied to suit different conditions by properly adjusting the swinging crank shaft frame structure about its pivotal mounting and engaging the pins 53 with the proper notches 57 in the lever arms 55. As shown in Figs. 1, 4 and 9, the intermediate tiller bars are raised up out of the way so that the machine may straddle a crop row during cultivation with the side tiller bars acting to agitate the soil at either side of the crop row. As shown schematically in Fig. 7, the intermediate tiller bars are shown raised above the crop row C with the side tiller bars digging the soil along parallel paths at opposite sides of the crop row. The lowering of the intermediate guide blocks 84 for the three intermediate tiller bars is effected simply by releasing the clips 93 from the cross rod 83 and sliding the sliding support elements 82 downwardly along the angular rod portions 80 of the rod structure 77 to the position shown in Fig. 10, so that all of the eleven guide blocks shown are located in side by side transverse alignment, thus enabling all of the tiller bars to till the soil across a path of substantial width. The digging action of the terminal pointed ends of the tiller bars may be varied by releasing the set screws 92 and moving the slide rods 87 downwardly relative to the guiding sleeves 88 and then retightening the set screws to hold the slide rods in adjusted position. Such adjustment of the slide rods effects lowering of the rod structure 77 on which the pivoted guide blocks 76 and 84 are mounted to bring the guide blocks closer to the terminal pointed ends of the tiller bars, so that when the tiller bars are actuated by the crank shaft, the profiles or contour of the orbital paths of the digging points are modified, herein narrowed and vertically elongated, and the rod structure 77 may be locked in adjusted position by the cross rod 100 engaged with the proper notches 102 in the plates 101. By adjusting the operating rod structure 98, the swinging mountings 91 for the rod structure 77 may be swung about the crank shaft axis to vary the height of the guide blocks with respect to the ground surface, thereby also to vary the digging depth and position of the tiller bars. The tiller devices may be stopped at will simply by sliding the engine mounting rearwardly along its guideways relative to the base frame to effect loosening of the driving belt 23, under the control of the hand lever 38.

Evidently, in lieu of the sliding mounting for the driving engine to effect tightening and loosening of the driving belt, a conventional releasable clutch may be provided and the engine may then be rigidly mounted on the base frame. Also, instead of the rigid wheel mounting for the rear supported wheels 11, swiveled mountings may be provided for caster wheels to facilitate maneuvering of the machine. Further suitable clamps in lieu of the notches 57 may be provided for releasably clamping the arms 52 of the swingable crank shaft frame structure to the lever arms 55, with the pins 53 at that time engaging longitudinal slots in the arms, to secure firmly the parts in position, thereby to avoid the possibility of the pins jumping out of the notches during actuation of the tiller bars. However, under most conditions, the notched arms adequately serve to hold the swingable frame structure in position.

As a result of this invention an improved soil tilling machine is provided whereby the soil may be tilled at different depths and with a varying digging action, and also not only may the soil be tilled across a wide path but also may be tilled in parallel paths at opposite sides of a crop row with the machine straddling the crop row. By the provision of the novel drive structure and the guiding and mounting means for the tiller bars, the latter may be effectively operated. The adjustable mounting for the intermediate tiller bars enables rendering of the intermediate tiller bars inactive while the side tiller bars act to cultivate the soil at opposite sides of a crop row; yet the intermediate tiller bars may be readily and quickly lowered into digging position when desired. The novel rod mounting structure for the swingable guiding blocks for the tiller bars not only provides adequate guiding of the bars near their digging points, but also provides readily operable means for controlling the position of the tiller bars. The machine is compact and relatively light in weight, is readily mobile and easily handled, and due to its novel structural features is well adapted for its intended purpose. These and other advantages of the invention will be clearly apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a soil tilling machine, the combination comprising a mobile base adapted to travel over the ground surface, tilling devices, means for adjustably mounting said tilling devices on said base for adjusting movement in vertical planes and embodying an adjustable supporting structure cooperating with said tilling devices for varying the digging depth of said tilling devices with respect to the ground surface, and an associated adjustable guide structure for said devices for varying the digging action of said tilling devices, said adjustable supporting structure including a swingable frame structure by which said tilling devices are carried and mounted on said base to swing in vertical planes and a device for holding said frame structure in its different angular positions of adjustment relative to said base, and said associated guide structure for varying the digging action of said tilling devices including a guide supporting frame pivotally mounted on said base to swing in vertical planes and adjustable mechanism on said base for holding said guide supporting frame in its different angular positions of adjustment with respect to said base.

2. In a soil tilling machine, the combination comprising a mobile base adapted to travel over the ground surface, tilling devices, means for adjustably mounting said tilling devices on said base for adjusting movement in vertical planes and embodying an adjustable supporting structure cooperating with said tilling devices for varying the digging depth of said tilling devices with respect to the ground surface, and an associated adjustable guide structure for varying the digging action of said tilling devices, said adjustable supporting structure including a swingable frame structure by which said tilling devices are carried and mounted on said base to swing in vertical planes and mechanism for holding said frame structure in its different angular positions of adjustment relative to said base, and said associated guide structure for varying the digging action of said tilling devices including a guide supporting frame pivotally mounted on said base to swing in vertical planes about an axis coincident with the pivotal axis of said swingable frame structure and adjustable mechanism on said base for holding said guide supporting frame in its different angular positions of adjustment with respect to said base.

3. In a soil tilling machine, the combination comprising a mobile base adapted to travel over the ground surface, tilling devices mounted on said base including a transverse row of relatively movable tilling elements having terminal digging portions, and an adjustable guide mounting structure for said tilling devices including adjustable elements cooperating with said tilling elements for raising certain of said tilling elements relative to the others to render the terminal digging portions of said raised elements inactive.

4. In a soil tilling machine, the combination comprising a mobile base adapted to travel over the ground surface, tilling devices including a transverse row of relatively movable tilling elements having terminal digging portions, an adjustable mounting structure carried by said base by which said tilling devices are carried and adjustable to vary the depth of penetration of said digging portions into the soil, and an associated adjustable guide structure cooperating with said tilling elements for variably determining the paths of movement of said terminal digging portions of said tilling elements relative to said base during the tilling operation and embodying adjustable guides for varying the contour of the paths of movement of said terminal digging portions to modify the digging action.

5. In a soil tilling machine, the combination comprising a mobile base adapted to travel over the ground surface, tilling devices including a transverse row of relatively movable tilling elements having terminal digging portions, an adjustable mounting structure carried by said base by which said tilling devices are carried and adjustable to vary the depth of penetration of said terminal digging portions into the soil, and an associated adjustable guide structure cooperating with said tilling elements for variably determining the paths of movement of said terminal digging portions of said tilling elements relative to said base during the tilling operations and embodying adjustable guides for said tilling elements for varying the contour of the paths of movement of said terminal digging portions to modify the digging action, and adjustable mechanism operatively connected to an element of said associated guide structure for moving said tilling elements bodily into and out of tilling position with respect to said base.

6. In a soil tilling machine, the combination comprising a mobile base adapted to travel over the ground surface, tilling devices including a transverse row of spaced-apart relatively movable tilling elements provided with terminal digging points, and an adjustable mounting structure for said tilling devices on said base and embodying an adjustable support movable relative to said base for elevating an intermediate tilling element to render the terminal digging point thereof inactive while the side tilling elements continue to operate, to permit the machine to straddle a crop row while operating to cultivate the soil at the opposite sides of the crop row.

7. In a soil tilling machine, the combination comprising a mobile base adapted to travel over the ground surface, a prime mover mounted on said base, a cross shaft journaled on said base and driven by said prime mover, a swingable frame structure pivotally mounted on said base to swing about an axis aligned with the longitudinal axis of said cross shaft, a crank shaft journaled on said swingable frame structure on an axis parallel to said cross shaft axis and driven by said cross shaft, soil tilling devices mounted on said swingable frame structure and driven by said crank shaft, adjustable means for holding said swingable frame structure in different angular positions about its pivot to vary the digging depth of said tilling devices with respect to the ground surface, said crank shaft including a series of crank pins equally angularly spaced apart lengthwise of the crank shaft and said tilling devices including reciprocatory tiller bars pivotally engaging said crank pins and spaced apart in a transverse row to move in parallel vertical planes, and means comprising frame elements pivotally mounted to swing about an axis aligned with the crank shaft axis and carried by said frame structure for varying the digging action of said reciprocatory tiller bars, and said means for varying the digging action including adjustable guides for said tiller bars and means for changing the positions of said guides along the lengths of said tiller bars.

8. In a soil tilling machine, the combination comprising a mobile base, a transverse row of reciprocatory tiller bars having digging points at their lower ends, means mounted on said base for reciprocating said tiller bars in an out of phase relation, an adjustable guiding means mounted on said base and comprising swingable guiding elements respectively engaging said tiller bars near their digging points, and means for adjusting said guiding elements along the lengths of said tiller bars toward and from said digging points to modify the contour of the paths of movement of the latter to vary the digging action.

9. In a soil tilling machine, the combination comprising a mobile base, a transverse row of reciprocatory tiller bars having digging points at their lower ends, means mounted on said base for reciprocating said tiller bars in an out of phase relation, an adjustable guiding means mounted on said base for engaging said tiller bars near their digging points, and means for adjusting said guiding means along the lengths of said tiller bars toward and from said digging points to modify the paths of movement of the latter to vary the digging action, said guiding means comprising a transverse rod structure carried by said base and pivoted guide blocks swingably mounted on said rod structure and having guide-portions for engaging said tiller bars.

10. In a soil tilling machine, the combination comprising a mobile base, a transverse row of reciprocatory tiller bars having digging points at their lower ends, means mounted on said base for reciprocating said tiller bars in an out of phase relation, an adjustable guiding means mounted on said base for engaging said tiller bars near their digging points, and means for adjusting said guiding means along the lengths of said tiller bars toward and from said digging points to modify the paths of movement of the latter to vary the digging action, said adjustable guiding means including guide elements along which certain of said guiding means are adjustable for elevating certain of said tiller bars to render their digging points inactive.

11. In a soil tilling machine, the combination comprising a mobile base, a transverse row of reciprocatory tiller bars having digging points at their lower ends, means mounted on said base for reciprocating said tiller bars in an out of phase relation, an adjustable guiding means mounted on said base for engaging said tiller bars near their digging points, and means for adjusting said guiding means along the lengths of said tiller bars toward and from said digging points to modify the paths of movement of the latter to vary the digging action, said guiding means comprising a transverse rod structure carried by said base and pivoted guide blocks swingably mounted on said rod structure and having guide-portions for engaging said tiller bars, said rod structure having horizontal rod portions and right-angle rod portions and a sliding support for the intermediate guide blocks for elevating the latter along said right-angle rod portions to render certain of said tiller bars inactive.

12. In a soil tilling machine, the combination comprising a mobile base adapted to travel over the ground surface, tilling devices having digging portions, means for adjustably mounting said tilling devices on said base for adjusting movement in vertical planes relative thereto and embodying an adjustable supporting structure cooperating with said tilling devices for varying the digging depth of said tilling devices with respect to the ground surface, and an adjustable guide structure for said tilling devices mounted for adjustment with and connected to said adjustable supporting structure and embodying means adjustable relative to said tilling devices for varying the contour of the paths of movement of the digging portions of said tilling devices to vary the digging action.

13. In a soil tilling machine, the combination comprising a mobile base adapted to travel over the ground surface, tilling devices, means for adjustably mounting said tilling devices on said base for adjusting movement in vertical planes relative thereto and embodying an adjustable supporting structure cooperating with said tilling devices for varying the digging depth of said tilling devices with respect to the ground surface, and an associated adjustable guide structure for said devices for varying the contour of the paths of movement of said tilling devices to vary the digging action, said tilling devices including reciprocatory tiller bars movable in vertical planes and having lower digging ends, and said associated adjustable guide structure for varying the digging action of said tilling devices including adjustable guides for said tiller bars and adjusting mechanism for varying the position of said guides lengthwise of said bars toward and from the digging ends of said bars.

14. In a soil tilling machine, the combination comprising a mobile base adapted to travel over the ground surface, tilling devices having digging portions, means for adjustably mounting said tilling devices on said base for adjusting movement in vertical planes relative thereto and embodying an adjustable supporting structure cooperating with said tilling devices for varying the digging depth of said tilling devices with respect to the ground surface, and an adjustable guide structure mounted for adjustment with said adjustable supporting structure and embodying elements adjustable relative to said tilling devices for varying the digging action of the digging portions of said tilling devices, said adjustable supporting structure including a swingable frame structure by which said tilling devices are carried and to which said adjustable elements are pivotally connected, said swingable frame structure mounted on said base to swing in vertical planes relative thereto and a device for holding said frame structure in its different angular positions of adjustment relative to said base.

References Cited in the file of this patent

UNITED STATES PATENTS

| Number | Name | Date |
|---|---|---|
| 1,486,504 | Wadenbach | Mar. 11, 1924 |
| 1,732,496 | Brundige | Oct. 22, 1929 |
| 1,988,756 | Smith | Jan. 22, 1935 |
| 2,068,828 | Tustain | Jan. 26, 1937 |
| 2,082,600 | Squires | June 1, 1937 |
| 2,236,562 | Brandes | Apr. 1, 1941 |
| 2,408,937 | Lendermon | Oct. 8, 1946 |
| 2,445,797 | Moore | July 27, 1948 |
| 2,526,736 | Edwards | Oct. 24, 1950 |

FOREIGN PATENTS

| Number | Country | Date |
|---|---|---|
| 182,128 | Great Britain | June 7, 1923 |